(12) United States Patent
Kar (10) Patent No.: US 7,269,571 B2
(45) Date of Patent: Sep. 11, 2007

(54) SYSTEM AND METHOD FOR FACILITATING CONSIGNMENT AND SALES OF INVENTORY OR SERVICES

(76) Inventor: Joseph M. Kar, 116 N. Robertson Blvd., Suite 705, Los Angeles, CA (US) 90048

( * ) Notice: Subject to any disclaimer, the term of this patent is extended or adjusted under 35 U.S.C. 154(b) by 955 days.

(21) Appl. No.: 09/983,702

(22) Filed: Oct. 25, 2001

(65) Prior Publication Data

US 2003/0083949 A1    May 1, 2003

(51) Int. Cl.
*G06Q 30/00* (2006.01)
(52) U.S. Cl. .................................... 705/26
(58) Field of Classification Search ............. 705/26, 705/27, 37, 34, 35, 80
See application file for complete search history.

(56) References Cited

U.S. PATENT DOCUMENTS

| | | | | |
|---|---|---|---|---|
| 5,495,412 A * | 2/1996 | Thiessen | ................... | 705/1 |
| 6,055,519 A * | 4/2000 | Kennedy et al. | ............. | 705/80 |
| 6,078,897 A * | 6/2000 | Rubin et al. | ................. | 705/14 |
| 6,108,639 A | 8/2000 | Walker et al. | | |
| 6,792,410 B1 * | 9/2004 | Donovan et al. | ............. | 705/4 |
| 6,886,000 B1 * | 4/2005 | Aggarwal et al. | ........... | 705/80 |
| 7,203,662 B2 * | 4/2007 | Das et al. | ................... | 705/37 |
| 2001/0034689 A1 * | 10/2001 | Heilman | ..................... | 705/37 |
| 2002/0026429 A1 * | 2/2002 | Lostis et al. | ................. | 705/80 |
| 2002/0035537 A1 * | 3/2002 | Waller et al. | ................ | 705/37 |
| 2002/0174035 A1 * | 11/2002 | Stern et al. | ................... | 705/27 |
| 2003/0023538 A1 * | 1/2003 | Das et al. | ..................... | 705/37 |
| 2007/0038506 A1 * | 2/2007 | Noble et al. | ................. | 705/13 |

OTHER PUBLICATIONS

Duncan Graham-Rowe entitled Call our agent for the best deal in town printed on May 29, 1999.*

* cited by examiner

*Primary Examiner*—Ronald Laneau
(74) *Attorney, Agent, or Firm*—Parsons & Goltry; Michael W. Goltry; Robert A. Parsons (57) ABSTRACT

A system and method for the facilitation of sales for items or services between vendors and buyers through an intermediary platform. The sale of these goods or services would be implemented utilizing a haggling process in which the intermediary and each individual buyer would bargain for a final sale price of that item. Generally, each of the vendors provides the intermediary with a retail sale price and a minimum sale price for each of the items. Thereafter, a buyer would counter the retail price for each of the items with an offer presumably below the retail price. Haggle tables are utilized to allow the intermediary to counter the buyer's initial offer as well as subsequent counter offers by the buyer. Once a sale price for the particular item or service is finalized, the item would be delivered or service rendered to the buyer and the vendors account with the intermediary would be credited to reflect this purchase.

28 Claims, 6 Drawing Sheets

SYSTEM AND METHOD FOR FACILITATING CONSIGNMENT AND SALES OF INVENTORY OR SERVICES

FIELD OF THE INVENTION

The present invention is directed to a system and method for facilitating the sale of inventory and/or services on a consignment basis, for example, by utilizing the Internet, or other communication devices.

BACKGROUND OF THE INVENTION

Historically, particularly in remote rural areas, sales persons or vendors traveled to their potential customers (whether retail, wholesale or raw materials) utilizing a covered wagon to store their wares. The customers would then examine these wares and the sale would be consummated. While some of these goods might carry a stated price therewith, the customers could be encouraged to bargain with the sales person before the sale was finalized. Likewise, buyers in need of services, for example, plumbing repair, carpentry, therapies, may seek out local vendors and often bargain over the price for the services before a sale is consummated.

The invention and utilization of motorized vehicles strikingly changed the demographics of our country, allowing suburbs to spring up in proximity to urban areas. The use of these vehicles changed the manner in which individuals would shop for goods or services. Rather than the sales person coming to the customers, individualized stores, shopping centers, and specialized service providers were established in which the customers traveled to these sales outlets. Based upon the size of the establishment as well as the personnel employed by the sellers, the stated sale price of a particular item could not be changed by the sales person and bargaining or haggling over this sales price was either discouraged or totally eliminated.

However, evolving technology has again altered the manner in which the buying public purchases various goods or services. This change in purchasing habits has also been precipitated by the change in the way of life of the purchasing public. For example, a large number of both partners in a marriage now work full time. When children are added to this couple's family, schedules can become very hectic. Therefore, many people are having a very difficult time finding sufficient time to comparatively shop or even travel to brick and mortar outlets to examine and purchase items. More and more of these brick and mortar stores are utilizing mail order catalogs to display their goods and to prompt the buyers to order these goods over the telephone.

Another change of technology which has altered the manner in which the public purchases goods or services would be the Internet. Virtually any company of even a modicum size has developed their own web pages allowing individuals to purchase goods or services on-line. These purchases would then be sent to the purchaser's residences without requiring the purchaser to travel to the brick and mortar establishment. Or, if a service, the customer would more conveniently and economically have the needed services provided to them.

The Internet also allows for the purchase of goods generated by a secondary market such as items owned by an individual and not the original vendor. Rather than leaving these unneeded but still usable items to waste or to consignment stores for sale, a number of Internet websites are dedicated to the sale of these items, including the sale of collectibles. U.S. Pat. No. 6,108,639, issued to Walker et al, describes such an operation. This patent is directed to a system and method for processing the sale of a secondary market item. An intermediary company would act as a vehicle allowing sellers to advertise various items on the Internet which can be purchased by respective buyers. The intermediary company would operate a website to illustrate the items for sale as well as include a purchase price. If a particular buyer wishes to purchase one or more of these sale items, the sale can be consummated over the Internet. Once this sale is consummated, a legally binding contract has been forged between the buyer and the seller. At this point, that item would be transported to the buyer and the seller would be properly compensated. It is noted that his patent contemplates the use of bargaining over the purchase price between a vendor and the buyer, with the intermediary working to coordinate the sale, negotiation, and consummation of each transaction.

SUMMARY OF THE INVENTION

The deficiencies of the prior art are addressed by the present invention which is directed to a system and method for sales of inventory through an intermediary, by facilitating a transaction between buyers and vendors directly or indirectly by means of electronic or digital communication. Although the present invention contemplates the utilization of a consignment technique, it should not be so limited and other types of sales relationships could be employed between the intermediary and the vendors. A number of vendors would advertise their goods or services through a website and/or platform developed by the intermediary. The intermediary would display images, descriptions, marketing material, and attributes of the products or services vendors wish to sell. Additionally, each of the vendors may include a suggested retail price to be associated with each of the items for sale. When a potential buyer contacts the intermediary by either logging on to the intermediary's website, by telephone, or wireless device, in conjunction with a sales catalog, the buyer would have the potential to negotiate over and purchase and/or order the goods or services advertised by one or more of the vendors. Although each of the advertised goods or services may include a suggested retail price, the present invention would contemplate that a haggling process can be entered into between the buyer and the vendor. The vendor must also inform the intermediary of a minimum sale price for each of the items. The intermediary would create or be provided with a haggle table used to produce counter offers to each of the buyer's offers. This haggling or bargaining process would continue until a final offer is made by either the buyer or the seller. At this point, if the buyer or seller accepts either parties' final offer, a sale would be consummated and the particular sales item or service would be delivered from the vendor to the buyer. It is important to note that none of the items could be sold at a price lower than the minimum sale price without the vendor's prior authorization.

Since many of the vendors utilizing the system of the present invention would be brick and mortar stores in which inventory can be depleted by sales consummated at the sellers' premises, either over the telephone, or with buyers traveling to the brick and mortar stores, it would be important for the operation of the present invention to insure that each of the vendors would be in a position to supply the sales which would be made over the intermediary's system. Therefore, each of the vendors would be required to maintain a separate "virtual" inventory and an in-store inventory.

The intermediary would inform that particular vendor when the virtual inventory has been depleted and automatically default to the conditional purchase feature. The conditional purchase feature enables a customer to place an advance order for the desired, but "out of stock" or unavailable good or service. In recognition of the buyer's advance order, the vendor may implement an incentive price or discount from the suggested retail price or create any other incentive to attract advance orders. Furthermore, if this virtual inventory has not been depleted but the in-store inventory has been depleted, the vendor would be able to apportion the virtual inventory to fulfill sales for the vendor's brick and mortar establishment.

Although it is contemplated that the major areas of coordination between the buyers and the intermediary would be over the Internet or wireless service, other types of communication could be used. For example, the intermediary could be equipped with a voice recognition system allowing the haggling process to be undertaken over the telephone with the voice recognition system having access to the haggle table so that proper counteroffers would be presented to the potential buyers. Alternatively, a vendor could directly interact with the customer to produce a counter offer without the use of the voice recognition system, for example, by e-mails through the intermediary.

Additional features of the present invention as well as a more detailed description of the invention will be illustrated with respect to the accompanying drawings, which are incorporated in and constitute a part of this specification, which illustrates several embodiments of the invention, and together with the description, serve to explain the principles of the invention.

DETAILED DESCRIPTION OF THE PRESENT INVENTION

As indicated hereinabove, one of the purposes of the system and method of the present invention is reflective of the fact that buyers are endeavoring to reduce the time and effort required in the shopping process in which repeated trips must be made to stores and the mall to competitively purchase various goods and services. While the present invention addresses some deficiencies of the prior art by providing an Internet/telephonic/wireless platform in which a number of vendors can, on a consignment basis or through other type of business relationship, offer their new and used goods or services for sale to a number of buyers, it should be noted that the system and method of the present invention is primarily to be used as a supplement for brick and mortar sales as well as for consummating sales over the telephone and wireless mediums. Because the system and method of the present invention would allow many sales of goods and services to be completed largely automatically, the sales force employed by each of the respective vendors would be made more efficient, thereby providing an exceptional opportunity for small and mid-sized businesses to compete for sales on a national level. On a broader basis, distributors, wholesalers, and suppliers of all types may utilize the present invention to manage their supply chain and distribution to retailers on a more individualized manner.

Figure 1:
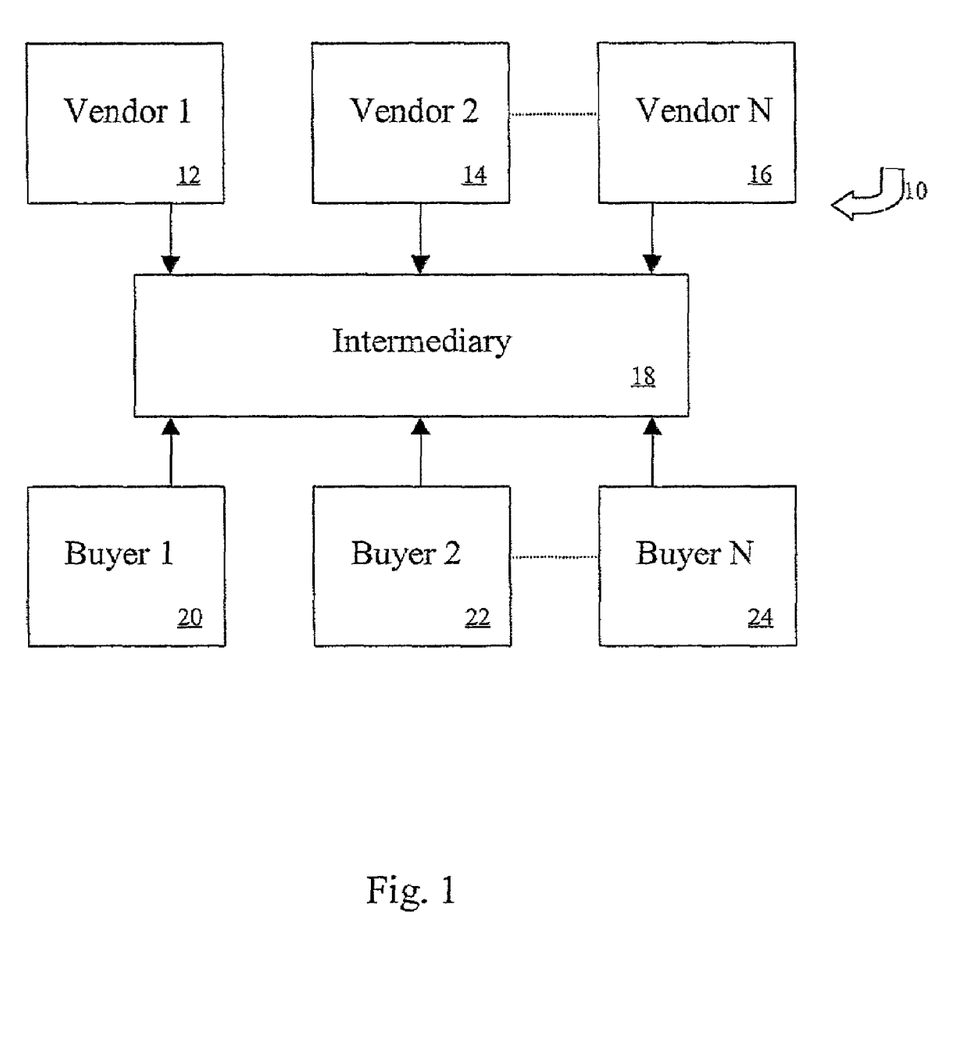
FIG. 1 illustrates a block diagram of the system of the present invention.

The system 10 of the present invention which would accomplish this end is illustrated in FIG. 1. A plurality of vendors 12, 14 and 16 would use an intermediary 18 as a platform for displaying their goods and services for sale to a plurality of buyers 20, 22 and 24. Although a large portion of the present invention contemplates the utilization of the Internet/telephonic/wireless services as a sales platform whereby the intermediary develops a website or sales platform, other types of commerce could also employ the present invention. For example, instead of presenting the goods and services over the Internet/telephonic/wireless, the intermediary 18 could be utilized in conjunction with a voice recognition system in which goods or services included in a circular or mail order catalog for sale by the vendors 12, 14 and 16 are sent to various buyers.

Figure 2:
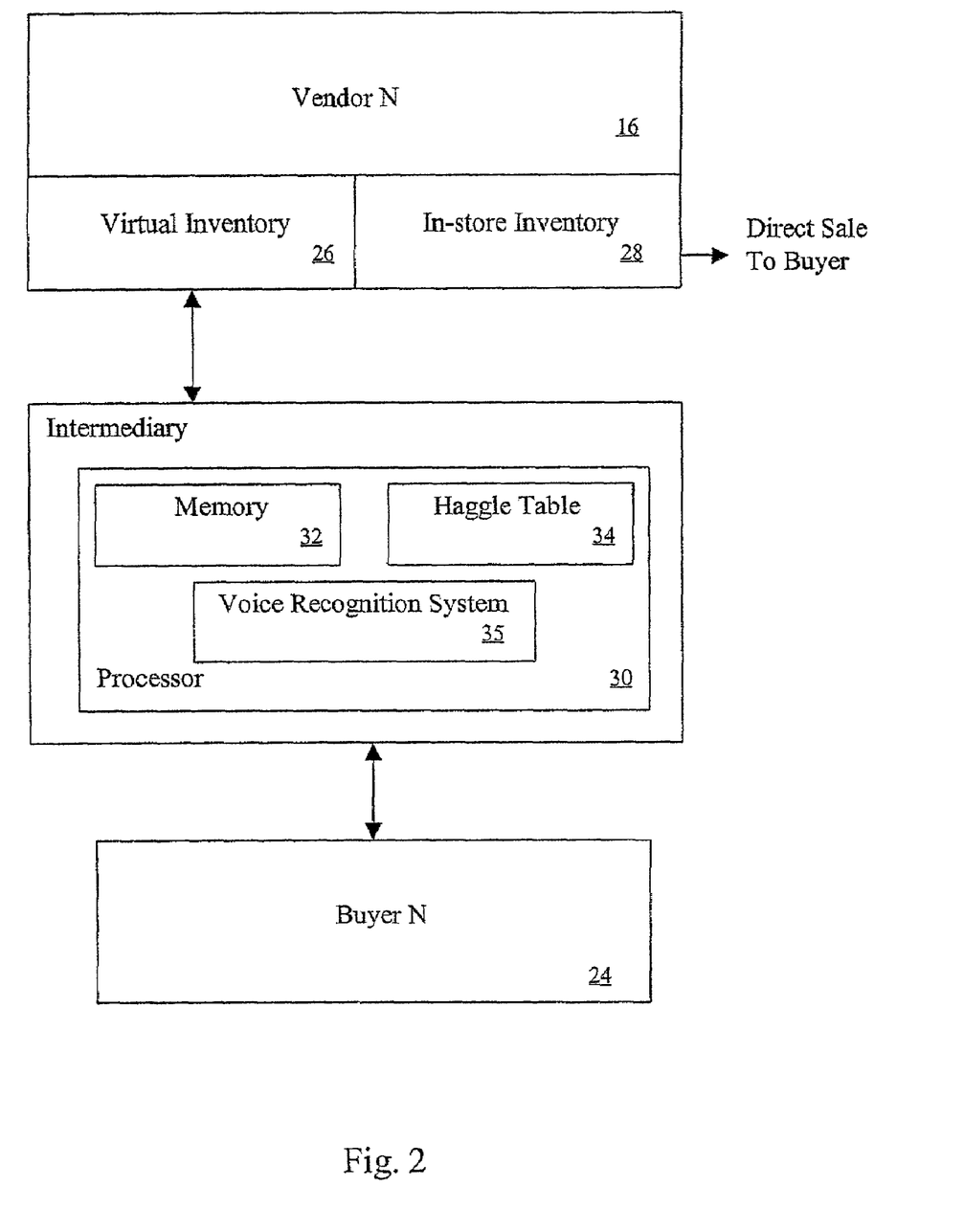
FIG. 2 illustrates a block diagram of a portion of the invention showing the allocation of the inventory.

FIG. 2 illustrates a more detailed description of the system and method of the present invention than is shown in FIG. 1, in which a vendor 16 and a buyer 24 utilize the intermediary 18 to consummate a sale. Since it is contemplated that many of the vendors would utilize the system and method of the present invention to augment their brick and mortar sales, it is important that inventory be tightly controlled. Therefore, the present invention contemplates a reserve method in which each of the vendors reserve at a minimum, one item in a virtual inventory 26. The vendor's remaining inventory is relegated to an in-store inventory 28. The vendor will then be able to directly manage and regulate inventory using on-line store management functions; and/or the conditional purchase feature. Items need not be taken out of the vendor's general inventory and the vendor would need only to regulate his/her in-store inventory so that sufficient virtual inventory is available for on-line sale through the present invention. Should an item reserved for on-line sale be needed to fill an in-store sale, the vendor must notify the intermediary (such as by phone or by the Internet). When this occurs, that particular item would default to a conditional purchase feature which is designed to salvage what otherwise might be a lost sale. A buyer faced with an "out-of-stock" item is offered the opportunity to order the desired item with delivery made shortly after restocking by that vendor. The vendor would still have the opportunity to sell this item through a straight purchase or haggled method, as described hereinbelow, with an optional discount for the buyer's inconvenience.

As illustrated in FIG. 2, communication is provided between the intermediary 18 and the virtual inventory 26 in a bi-directional manner allowing the intermediary to inform the vendors of the number of items in the virtual inventory 26. Therefore, the vendor would be made aware of the depletion of the virtual inventory 26, allowing the vendor to order or produce more inventory, some of which would be designated as virtual inventory. Likewise, the vendor would inform the intermediary when the vendor is forced to move items from the virtual inventory 26 to the in-store inventory to finalize a sale within the vendor's in-store location. This communication between the vendor 16 and the intermediary 18 could be lessened dramatically if the intermediary is authorized to manage the vendor's entire inventory. For example, if the vendor operates multiple outlets at more than one physical sales location, the inventory control system would track the independent virtual inventory as well as the physical inventory of each of the vendors for each location. Additionally, if the nearest store's inventory is depleted, the inventory control system would direct a purchase order to any other location with sufficient inventory. This would help regulate a chain store's sales through the intermediary and coordinate delivery of the sold item.

The platform of the intermediary 18 would be managed by computer systems controlled by a processor 30. The processor would include, among other features, a memory 32 provided with software for operating the system and method according to the present invention as well as a haggle table 34 to control the bargaining process and a voice recognition system 35.

Although it is contemplated that most communication between the buyers and the intermediary would be through the use of the buyer's personal computer, telephone or wireless device, it is realized that not every buyer has access to a personal computer. Consequently, the voice recognition system 35 would allow each buyer to haggle with the intermediary over the phone. Furthermore, the voice recognition system itself can be eliminated and an electronic exchange could occur between the buyer and the vendor to negotiate a purchase price for a particular item.

Figure 3:
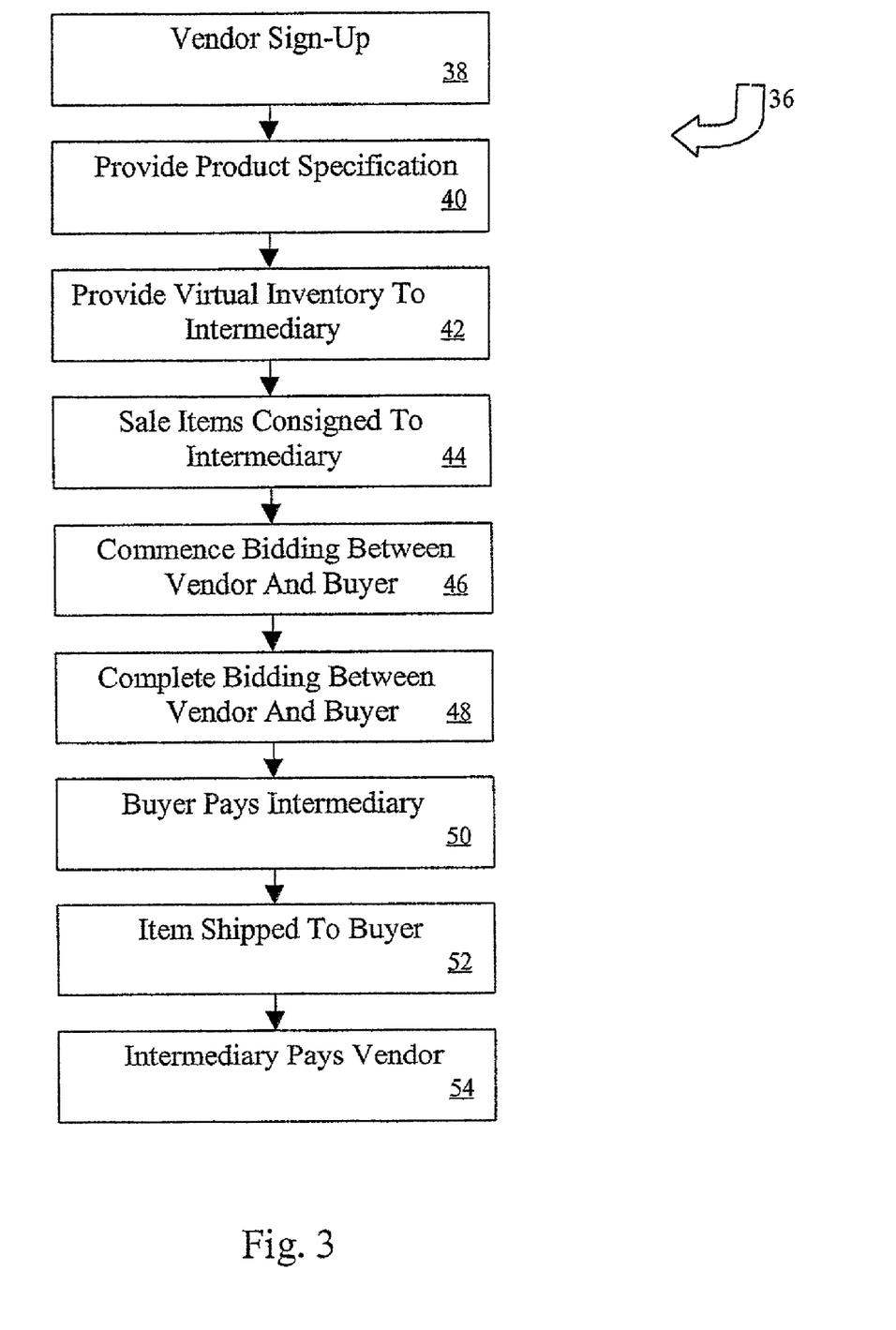
FIG. 3 is a flow diagram of the present invention.

The generalized method of the present invention 36 is illustrated in FIG. 3. The intermediary would sign up various vendors at step 38 as participants in the system and method of the present invention or, license its use for proprietary use. This sign-up process could occur in one or more geographic areas. A consignment or other type of sales agreement would be signed between the intermediary 18 and the vendors to give the legal rights to sell or provide a buyer the opportunity to buy a selected number of the vendor's inventory through the various web and telephonic methods. Information such as product images, pricing points and other information pertinent to each of the items for sale would be provided to the intermediary by each of the vendors or incorporated into the vendor's proprietary system if licensed. Alternatively, the intermediary, based upon information provided by the vendors, could provide this information directly to the buyers. The information would then be translated into a presentable form for virtual sales over the Internet and for computerized voice-recognition catalog sales, or through wireless mediums.

The intermediary would also compile a directory including various information provided from each of the vendors. This information could include, but is not limited to, the business name, location information, contact information, a link to the intermediary platform as well as days and hours of operation for the vendor's store locations. The intermediary would operate utilizing a comprehensive search engine and sales assistance known as "Tesa" which would be able to specifically search through the consignment database of goods and services for a buyer's necessities. The search can be done based upon any combination of listed search criteria such as price ranges, quality of goods and services, physical parameters (if applicable), model number, location, and type of item or natural language search. Tesa would sift through the consignment database for suitable items to display to the buyer for a potential sale. The search can occur in rounds to help narrow down an item, or all at once to allow the buyer an opportunity to "window shop". Although it has been found that Tesa would operate very efficiently with the system and method of the present invention, other search engines could also be employed.

The vendor provides the intermediary with the product specification at step 40. The virtual inventory is determined at step 42, these items would be then consigned to the intermediary at step 44 for sales to the various potential buyers. Although FIG. 3 illustrates a consignment of goods from the vendor to the intermediary, it is acknowledged that other types of sale arrangements can be used, including licensing the invention for proprietary use.

At this point, the intermediary 18 would give the opportunity to one or more of the buyers to purchase any of the items in the virtual inventory of any of the vendors. This purchase could be consummated in the usual manner in which a retail price associated with each of the items for sale must be met by the buyer. Alternatively, according to the system and method of the present invention, the suggested retail sales price or no price could be used as a starting point for a bargaining or haggling process to be commenced between the vendor and the buyer at step 46. Once this bargaining process has been completed, thereby resulting in the sale of the particular product at a haggled price at step 48, the buyer would pay the intermediary at step 50. At this point, the item would be shipped to the buyer at step 52 and the intermediary would pay the vendor at step 54. Upon any sale, the item is immediately deducted from the vendor's virtual inventory and payment is processed directly to the vendor's demand deposit account or other banking arrangements, as per a service agreement between the vendor and the intermediary. Alternatively, the amount could be credited to the vendor's intermediary account.

Once the buyer has paid the intermediary at step 50, the vendor would be immediately notified using various direct links known in the art such as faxes, e-mails, voice mails or the like of that particular purchase. The vendor must then follow a prescribed procedure to confirm receipt of the order and that processing is underway. The vendor would then confirm the sale to the intermediary and immediately packages the item for pick up by a courier or by customer instore, in their appropriate manner of business. Thereafter, and upon confirmation that the purchase item is received by the courier or buyer, payment is finalized. Since it is contemplated that the present invention would result in extensive use of a courier service, the intermediary would have the ability to negotiate bulk rates and to develop relationships with major courier companies.

Eventually, the lowest courier rate can automatically be assessed with a particular courier. Alternatively, the vendor itself would determine the particular courier which is utilized. Payment for shipping can be designated to either the vendor or the buyer depending upon the retail industries practice or at vendor's or buyer's option. It is noted that higher priced items are better able to absorb a shipping charge and thus merchants may more readily pay for shipping on such items. A further alternative is that the buyer would elect to pick up the purchased item directly from the store regardless of the fact that the sale was finalized on-line. The information included in the aforementioned directory will be tied to this sales feature and would allow the local buyers to centralize a search to buy items from their local retailers.

The present invention in which a consignment sale is effectuated between a vendor and a buyer could utilize three different types of sales techniques. The first technique would be the straight sale in which the vendors would offer their items for sale at a fixed price with possible sales or promotional discounts. The second type would be the auction format adopted by various companies such as Yahoo or E-Bay in which a number of sellers bid among themselves for a particular item offered by a single vendor. The third method of producing a sale, according to the present invention, would be to employ a haggling or bargaining technique in which a single buyer would haggle with a single vendor to determine the sales price of a single item.

Figure 4:
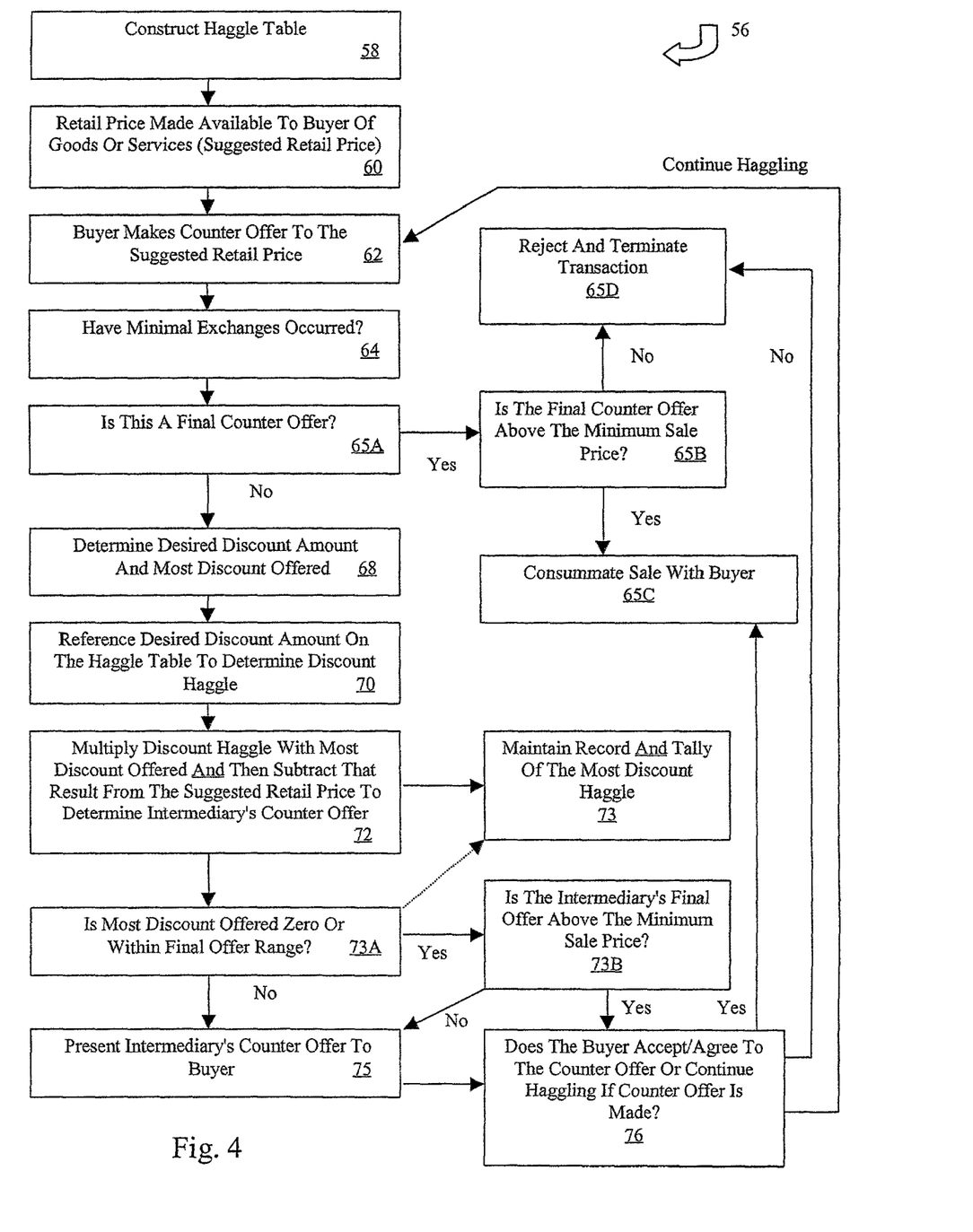
FIG. 4 is a flow diagram illustrating the haggle method according to the present invention.

This third technique 56 is illustrated in FIG. 4. It is contemplated that this haggling process would automatically be conducted utilizing the intermediary's platform such as its website. Therefore, a haggle table must be constructed at step 58. The haggle table is an artificially created reference chart used to calculate the intermediary's counter offers to a buyer's offer or offers. It can be created to suit each of the particular industries utilizing the system and method of the present invention. Therefore, since a plurality of vendors would utilize this system, it is contemplated that several of these haggle tables would be constructed and would be simultaneously maintained by the intermediary. Consequently, although FIG. 4 illustrates the use of a single haggle table, it is noted that a number of these haggle tables would be included in the memory of the intermediary. A standard industry model which the intermediary would construct could be used as a default unless the vendor elects to utilize an alternative for his/her own transactions. Eventually, these haggle tables can be made to reflect different haggling techniques. It is important to note, however, that the haggle tables are flexible to suit any negotiating technique by simply re-setting the benchmark numbers relied upon for the intermediary's counter offers. It is also important to note that the particular haggle table can be created with each particular vendor's input.

Once the haggle table is constructed and included into the memory of the intermediary's platform, and the vendor has applied the retail benchmark price for each of the items offered for sale or the item is "up for bidding" (no suggested retail price provided) at step 60, negotiations between the vendor and the buyer can be commenced to stimulate an exchange and promote sales. At this point, the buyer would make a counter offer to the suggested retail price through the intermediary's platform at step 62 for a particular item. Since it is important that a base benchmark price be established under which that particular item would not be sold, the vendor would also supply to the intermediary a minimum sales price for each of the retail items which would also be included in the intermediary's database and algorithms.

The intermediary notes whether minimum exchanges have occurred at step 64. At this point, the buyer may be given the option to present a final counter offer at step 65 A. The buyer is usually permitted to make a final offer after the first round of haggling has ended. FIG. 4 demonstrates the final offer function at the instance of a transaction, however, this option may be enabled after a designed number of minimum exchanges has occurred between the transacting parties.

Therefore, the buyer and vendor could not present each other a final offer until they have attempted to haggle a certain number of times. If the final offer function is only engaged after a designated number of minimum exchanges in step 64, the transaction proceeds directly from step 62 to step 68. But, once the final offer option is enabled, the transaction proceeds from step 62 to step 64 and so on. This function permits the transacting parties to efficiently determine if a sale can be made. If the buyer elects to present a final offer, the intermediary determines whether the buyer's final offer is greater than the minimum sale price at step 65 B. If it is greater, the buyer may consummate the sale at step 65 C. If the buyer's offer is less than the minimum sale price, the haggling ceases without consummating the sale at step 65 D.

The present invention would, at step 68, calculate a desired discount amount (DDA) and a most discount offered (MDO) The desired discount amount is determined by subtracting the buyer's offer from the stated retail price. The most discount offered is determined by subtracting the minimum sale price from the stated retail price. The haggle table associated with the particular item for sale would be referenced at each round/exchange of haggling for the desired discount amount to determine a discount haggle (DH) at step 70. The discount haggle is a random number from a determined percent number range that the intermediary determines. This discount haggle is multiplied by the most discount offered to determine an amount which would be subtracted from the stated retail price which would then constitute a counter offer at step 72. At this point, the buyer is presented with the counter offer at step 75 and is then free to purchase the item at that price or continue haggling at step 76 until the intermediary or the buyer make a final offer. If the buyer continues to haggle, the intermediary would replace the stated retail price with a prevailing haggle price for that item and continues the haggling processing as described herein using that prevailing haggle price at each successive exchange.

Additionally, the intermediary will maintain a running count or tally of the successive most discount offered which would involve maintaining a separate and constant record of the most discount offered from the inception of the haggling and subtracting the most discount offered from the product of the most discount offered discount haggle for every round of haggling at step 73. When the most discount offered reaches zero or is within a designated number range, above the minimum sale price as shown by steps 73 A and 73 B, the intermediary can issue a final offer to the buyer. The running count is an internal record of the remaining most discount offered from the start of the haggling and subtracting the product of the discount haggle multiplied by the most discount offered at every exchange between the buyer and the vendor. Please note that the most discount offered represents the highest dollar discount the intermediary is authorized to negotiate with the buyer. When it reaches zero, only the minimum sale price remains to be offered. At that price or within a given range thereto, the intermediary can make a final offer to the buyer for the desired item. At step 75, the buyer is presented with the final offer determined at step 72, and at step 76, the buyer is given the opportunity to consummate the sale or reject the offer and terminate the transaction between the buyer and the vendor for that particular item. Also, if the final offer is made by the buyer and within a designated dollar range of the minimum sale price, the intermediary may forward the offer directly to the vendor for acceptance or rejection. But, if the vendor does not respond within a certain time period, the final offer is deemed rejected.

Because of the possibility of unfairness to the vendor or the buyer, the intermediary may impose artificial restrictions on the successive haggling process so that the counter offers remain orderly. For example, a successive haggle price by the buyer made at or below the first haggle price or any subsequent haggle price, may trigger a modified counter offer from the intermediary. If this occurs, the intermediary can respond by reiterating the last haggle price and/or noting the unfairness. Alternatively, the present invention could continue haggling based on buyer's last counter offer and irrespective of the unfairness, but so long as the final sale price is above the minimum sale price. Finally, a search engine, such as Tesa, could be employed to search for an item of comparable value to the unfair counter offer. Furthermore, since the buyer might be aware of the existence of the minimum sale price and therefore would continue to haggle to endeavor to obtain this lowest possible price, a final offer could be triggered after a predetermined number of exchanges have been made between the buyer and the intermediary for a particular item.

Although it is contemplated that the haggle system of bargaining be conducted strictly between the buyer and the intermediary, based upon various restrictions which might be imposed by the vendor, it is possible to permit a direct exchange with the vendor. Although it might not be advisable for the vendor to personally respond to every round of haggling because of the difficulty in managing such an operation, certain vendors may find a direct exchange with the vendor helpful for their industry.

An example illustrating the haggling process shown in FIG. 4 will now be given. If the buyer counters with a $75 offer for an item listed at a retail price of $110 and a minimum sales price designated at $90, the intermediary would initially determine the desired discount amount which would be ($110-$75) which would equal $35. The intermediary has already determined that the most desired (MDO) would be $25 ($110-$90). Checking the haggle table for the desired discount amount of $35 for that item or service, the intermediary may therefore only negotiate the determined amount of the most discount offered in accordance with the haggle table criteria. A random number corresponding to the desired discount amount is determined (the discount haggle) from the haggle table and is multiplied by the most discount offered. Assuming that the random number chosen is 23.5% and that the most discount offered of $25 is utilized, then the counter offer would be $25×23.5% or $5.87 minus the stated retail price of $110 resulting in a counter offer of $104.13. The intermediary would then confirm that the intermediary's offering price is above the minimum sale price and whether a final offer is appropriate. If this is the case, the intermediary would counter offer to the buyer an amount of $104.13. At this point, the buyer is free to purchase the item at that price or continue haggling until the intermediary makes an acceptable a final offer or haggling ceases due to loss of interest. If the buyer continues to haggle, the intermediary replaces the stated retail price with the prevailing haggle price for that item and the minimum sale price is then subtracted from the prevailing price to determine the current most discount offered, and the running count for the most discount offered is updated.

Both the buyer and the intermediary are able to make a final offer to each other using this process. The buyer may do so at any time during the haggling process with some systemic limitations. This would simply require inputting the desired price and clicking on a final offer icon if the Internet is utilized. The intermediary would determine whether this amount is above the minimum sale price and would respond accordingly.

The intermediary could issue a final offer upon depletion of the most discount offered or at a point which the prevailing price of an item is within a desired range to the minimum sale price. This would be achieved after successive haggling and vendors or the intermediary may also designate a period when a final offer must be made in order to move the process along. It is important to note that the final offer does not necessarily have to be the minimum sale price. The intermediary may present a final offer within a given percentage or dollar amount above or, if authorized, below the minimum sale price.

Figure 5:
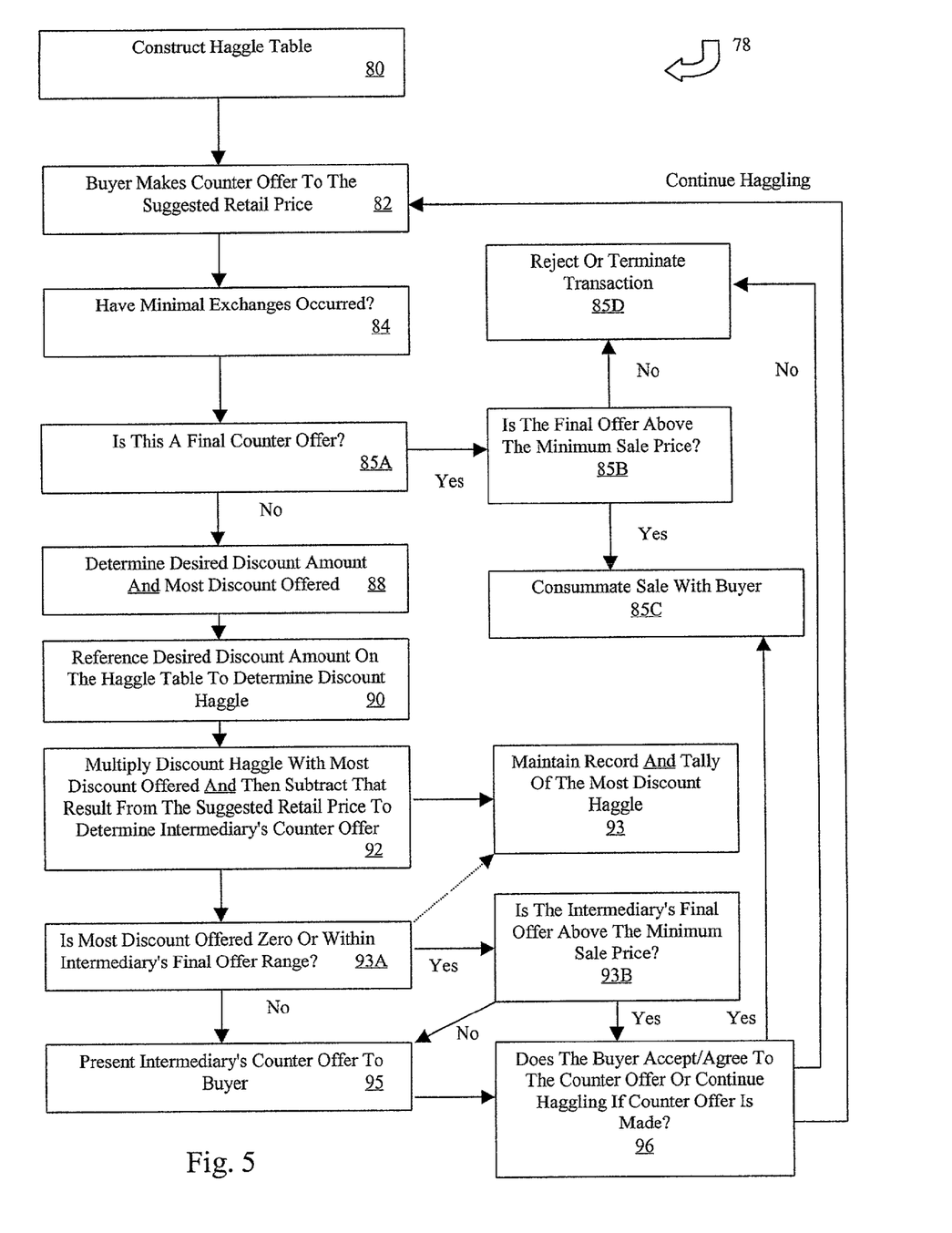
FIG. 5 is a flow diagram illustrating the reverse haggle method according to the present invention.

FIG. 5 illustrates an alternative 78 to the haggling process described in relation to FIG. 4. This alternative is characterized as a reverse haggling process. This process permits a vendor to allow a buyer to start the haggling process with their own offer for a good or service. In this process, the vendor would display an item or service for sale without a price and the buyer would then offer a price for that item. To assist the buyer in determining at least an initial offer price, the intermediary may display the average selling price of that particular item which was reached based upon previous haggling of that item with other buyers. As shown at step 80, a reverse haggle table would be constructed. At this point, the buyer would make an offer to the intermediary at step 82. The intermediary would determine and verify if minimum exchanges occurred at step 84. The intermediary would then determine if the buyer made a final offer at step 85 A. If so, the intermediary confirms whether the final offer is above the minimum sale price at step 85 B.

The sale is consummated with the buyer, at step 85 C, if the buyer's final offer is above the minimum sale price. However, if the buyer's final offer is below the minimum sales price, the intermediary rejects the final offer and terminates the sale in a prescribed manner at step 85 D. The desired discount amount is referenced to the reverse haggle table to determine the discount haggle at step 90. The intermediary would then multiply the discount haggle with the most discount offered and then subtract that result from the suggested retail price to determine the intermediary's counter offer at step 92.

At step 93 A, the intermediary determines whether the most discount offered is zero or within the intermediary's final offer range. If so, the intermediary confirms that the final offer is above the minimum sale price at step 93 B. If the intermediary's final offer is above the minimum sale price, the intermediary presents the final offer to the buyer and waits a designated time period for the buyer's response at step 96. The buyer may consummate the sale at step 85 C, reject final offer and terminate the transaction at step 85 D, or the transaction terminates after the designated time period expires at step 85 D.

During this process, the desired discount amount and the most discount offered are determined at step 88. If the intermediary's final offer is not above the minimum sale price at step 93 B, the intermediary presents the buyer with the intermediary's offer, derived at step 92, as the intermediary's final offer. The buyer may then accept/agree to the final offer or reject it at step 96. If accepted, the buyer consummates the transaction at step 85 C; or if rejected, the sale is terminated at step 85 D. If the most discount offered is not zero or within the final offer range, this counter offer would be presented to the buyer at step 95 and the buyer may accept/agree to the counter offer; reject and terminate; or reject and counter offer at step 96. If the buyer accepts/agrees, the transaction is consummated at step 85 C.

If the buyer rejects the offer and terminates, the transaction is terminated at step 85 D. Or, if the buyer rejects the offer and makes a subsequent offer, the haggling process returns to step 82, until the transaction is consummated or terminated. The vendor may require a minimum number of exchanges between the buyer and the seller to permit the haggling process would continue, but risks losing the buyer's interest.

Figure 6:
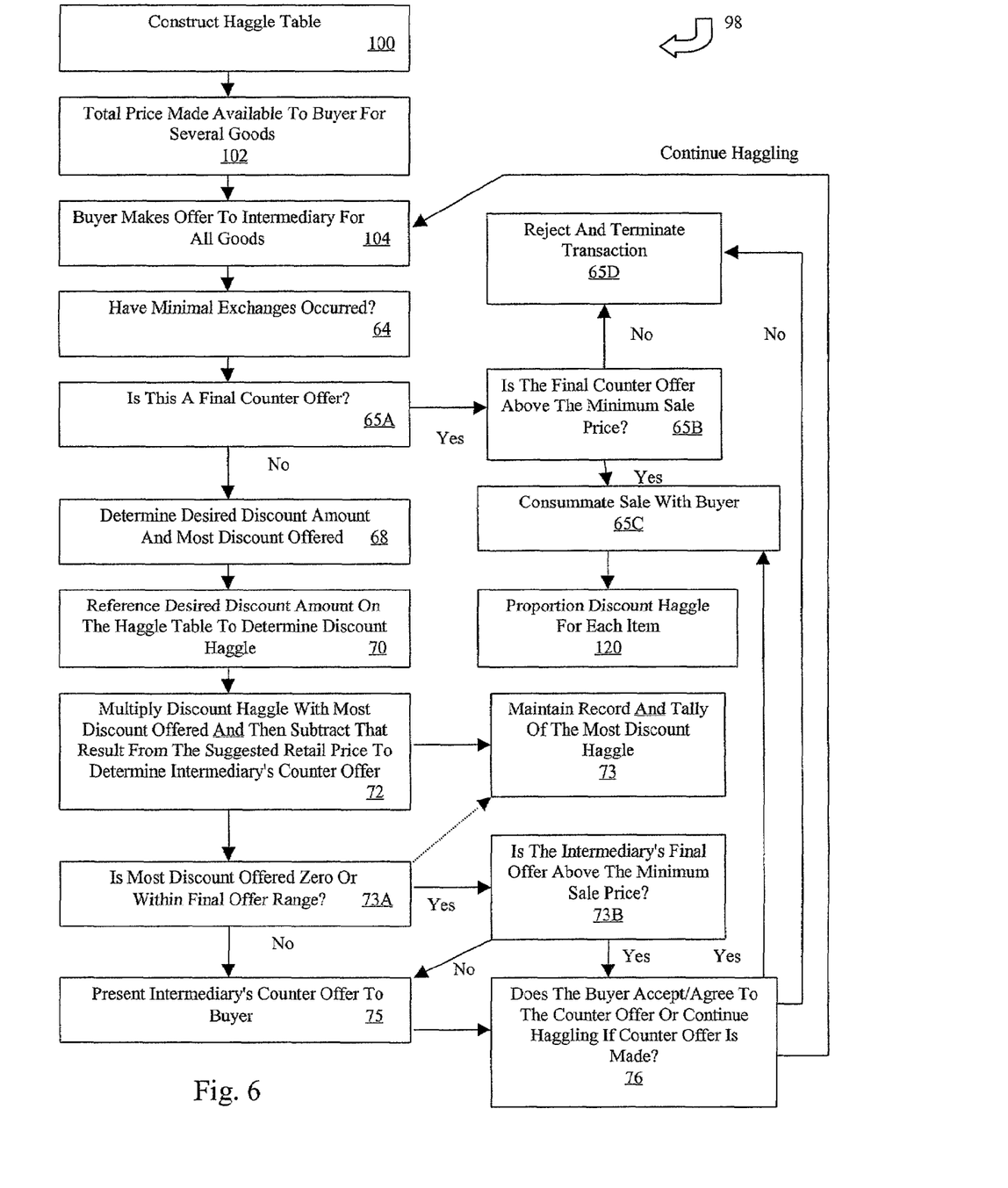
FIG. 6 is a flow diagram illustrating this bulk the haggle method according to the present invention

FIG. 6 illustrates another embodiment to the haggle process shown in FIG. 4. Consequently, we have included similar reference numerals. This alternative 98 creates a bulk haggling scenario which would enable buyers of multiple items associated with one or more of the vendors to counter offer a total price off the calculated stated retail price of all of the items. As was true with respect to FIG. 4, a haggle table is constructed at step 58. This haggle table consists of the exact table or tables created with respect to the algorithm of FIG. 4. If a buyer selects multiple goods to be purchased, the intermediary would provide the buyer with a total retail price for all the goods, as well as internally calculates the total minimum sale prices at step 102 to form the required pricing points to haggle. The buyer would then make an offer to the intermediary for all of the goods at step 104. At this time, the intermediary would determine whether the offer is greater than the total minimum sale price and would determine whether minimal exchange has occurred at step 64. If this is not the case, the desired discount amount as well as the most discount offered or most percentage discount offered for each of the items would be determined at step 68 and the comparison similar to what is described with respect to FIG. 4 is made at step 70. The discount haggle is multiplied by the most discount offered and subtracted from the total retail price to determine the counter offer at step 72. A counter offer is then made and haggling is either discontinued and a sale consummated or the haggling would continue in a similar manner. If the buyer's offer to the intermediary at step 104 is greater than the total minimum sale price, the sale of all of the items could be consummated at that point or, similar to the scenario described with respect to FIG. 4, if the vendor or vendors would insist upon a predetermined number of exchanges between the buyer and seller, the haggling process would continue. It is noted that each of the vendors would have an option as to whether they wish to engage in this bulk haggling feature. By aggregating potential discounts, vendors will have the opportunity to institute a cooperative selling method and provide larger total discounts to the buyers, thereby benefitting both buyers and vendors by creating incentives to buy and sell more items.

Particularly if more than one vendor is involved in the bulk haggling process, it is important to partition the discount haggle for each of the purchase items which is shown at step 120. This is necessary since there is a potential for the buyer to return one or more items of the total number of items purchased utilizing this method. Should a buyer desire to return one or more of the bulk haggled items, a definitive price must be stated to permit credit or exchange.

This cooperative selling method aggregates the total most discount offered to potentially award a larger overall discount on the total purchase. The buyer can take advantage of the aggregate most discount offered and maximize the buyer's discount haggle to thereby help consummate sales at a maximum value. The intermediary would maintain a running count of the total discount haggle and calculate at what price each item is finally sold by determining the individual discount haggle. The intermediary is also able to provide a final sale price for each item by first apportioning from the total sale price the minimum sale price for each purchased item and then calculating and apportioning the dollar value of the remaining individual discount haggle on top of the minimum sale price. The individual dollar value of the discount haggle is derived by calculating the individual most discount offered for that item and dividing it by the aggregate most discount offered giving the portion of the discount that item offers to the bulk haggle and multiplying that amount by the amount above the aggregate minimum sale price. This amount of the aggregate minimum sale price equals the total final sale price minus the aggregate minimum sale price of the desired items to be purchased. Note that the final sale price must always be above the aggregate minimum sale price since no individual item may be sold below its minimum sale price.

In all of the embodiments discussed, the most discount offered is constantly updated after each round of haggling to reflect the amount of discount haggled (discount already negotiated) by the buyer in the preceding rounds of haggling. Additionally, the running count of each and every negotiation is valuable for business and marketing analysis and study, as well as a means to trigger a final offer from the intermediary.

It will be apparent to those skilled in the art that various modifications and variations can be made to the system and method of the present invention without departing from the scope or spirit of the invention. Thus, it is intended that the present invention cover the modifications and variations of this invention provided that they come within the scope of the claims and their equivalents.

What is claimed is:

1. A system for facilitating the sale of goods or services offered from at least one vendor to at least one buyer through an intermediary platform in communication with vendors and the buyers, comprising: at least one processor and memory device associated with the intermediary platform, said memory device provided with descriptive information relating to each of the goods or services offered by the vendors as well as at least one haggle table, said at least one processor utilizing said descriptive information as well as said haggle table to conduct a haggle process with at least one of the buyers to facilitate the consummation of a sale of the goods or services from at least one of the vendors, wherein said descriptive information comprises a retail sales price and a minimum sales price, and a description of the goods or services offered, for each of the goods or services offered, wherein said haggle table comprises a list of desired discount amounts, used to produce counter offers responsive to a buyer's offer or counter offer for a particular good or service offered by at least one of the vendors, said desired discount amount equaling a buyer's offered price deducted from said retail sales price, and wherein said discount haggle allows a seller to counter-offer based on a random selection within a pre-defined range.

2. The system in accordance with claim 1 in which said second communication device is a personal computer communicating with said intermediary platform over the Internet.

3. The system in accordance with claim 1 wherein said second communication device is a telephone, or wireless communication device.

4. The system in accordance with claim 3 wherein the intermediary platform includes a voice recognition device allowing said haggle process to be automatically conducted between at least one of the buyers and the intermediary platform.

5. The system in accordance with claim 1 further wherein an initial offer in said haggle process is the retail sales price offered by a vendor through the intermediary platform.

6. The system in accordance with claim 1, further including a discount haggle which is a set percent number range by which a number within that range is selected by vendors.

7. The system in accordance with claim 1 when said counter offer is determined by calculating a desired discount amount equaling the buyers said counter offer deducted from said retail sale price, said desired discount amount then compared to the values provided in said haggle table used to provide said counter offer.

8. A system for facilitating the sale of goods or services offered from at least one vendor to at least one buyer, comprising: an intermediary platform provided with at least one processor and a memory device, said memory device provided with descriptive information relating to each of the goods or services offered by the vendors as well as a haggle table, said at least one processor utilizing said descriptive information as well as said haggle table to conduct a haggle process with at least one of the buyers to facilitate the consummation of a sale of the goods or services of at least one of the vendors; a first communication device between each of the vendors and said intermediary platform; and a second communication device between each of the buyers and said intermediary platform, wherein said descriptive information comprises a retail sales price and a minimum sales price, and a description of the goods or services offered, for each of the goods or services offered, wherein said haggle table comprises a list of desired discount amounts, used to produce counter offers responsive to a buyer's offer or counter offer for a particular good or service offered by at least one of the vendors, said desired discount amount equaling a buyer's offered price deducted from said retail sales price, and wherein said discount haggle allows a seller to counter-offer based on a random selection within a pre-defined range.

9. The system in accordance with claim 8 in which said second communication device is a personal computer communicating with said intermediary platform over the Internet.

10. The system in accordance with claim 8 wherein said second communication device is a telephone, or wireless communication device.

11. The system in accordance with claim 10 wherein said intermediary platform includes a voice recognition device allowing said haggle process to be automatically conducted between at least one of the buyers and said intermediary platform.

12. The system in accordance with claim 8 further wherein an initial offer in said haggle process is the retail sales price offered by said vendor through the intermediary platform.

13. The system in accordance with claim 8 when said counter offer is determined by calculating a desired discount amount equaling the buyers said counter offer deducted from said retail sale price, said desired discount amount then compared to the values provided in said haggle table used to provide said counter offer.

14. A method of facilitating the sale of goods or services offered from at least one vendor to at least one buyer through an intermediary platform, in communication with the vendors and the buyers comprising the steps of: each of the vendors providing the intermediary platform with descriptive information relating to each of the goods or services offered by the respective vendor; said descriptive information including a retail sales price and a minimum sales price for each of the goods or services; constructing at least one haggle table, said haggle table stored in a memory device associated with a processor located at the intermediary platform; initiating a haggle process by the intermediary platform offering the retail price of each of the goods or services to the buyers; at least one of the buyers responding to said initiating step by communicating to the intermediary platform a first counter offer to said retail price to a first of the goods or services; the intermediary platform comparing said counter offer to said minimum sales price of said first of the goods or services; and consummating the sale of said first of the goods or services of said counter offer is greater than said minimum sales price of said first of the goods or services, wherein said haggle table comprises a list of desired discount amounts, used to produce counter offers responsive to a buyer's offer or counter offer for a particular good or service offered by at least one of the vendors, said desired discount amount equaling a buyer's offered price deducted from said retail sales price, and wherein said discount haggle allows a seller to counter-offer based on a random selection within a pre-defined range.

15. The method in accordance with claim 14, further including the steps of: continuing said haggle process if said counter offer is less than said minimum price of said first of the goods or services with the intermediary platform determining a second counter offer utilizing said retail sales price, said counter offer, said minimum sales price and said haggle table; presenting said second counter offer to the buyer encouraging the buyer to make a third counter offer; and further continuing said haggle process until a final offer is accepted or no additional counter offers are made by the buyer or vendor.

16. The method in accordance with claim 15 wherein said second counter offer is determined by calculating a desired discount amount equaling the buyer's said first counter offer deducted from said retail sale price, said desired discount amount then compared to a range of values provided in said haggle table used to produce said second counter offer.

17. The method in accordance with claim 16 wherein said second counter offer is further determined by calculating a most discount offered equaling said minimum sales price deducted from said retail sales price, and using said most discount offered, said desired discount amount and said haggle table to produce said second counter offer.

18. The method in accordance with claim 15 wherein the sale of said first of the goods or services is consummated only after a predetermined number of offers and counter offers between the buyer and vendor through said intermediary have been exhausted.

19. The method in accordance with claim 15 when said counter offer is determined by calculating a desired discount amount equaling the buyers said counter offer deducted from said retail sale price, said desired discount amount then compared to the values provided in said haggle table used to provide said counter offer.

20. The method in accordance with claim 15, wherein the sale is consummated only after one party presents a final offer.

21. The method in accordance with claim 14 wherein the sale of said first of the goods or services is consummated only after a predetermined number of offers and counter offers between the buyer and vendor through said intermediary have been exhausted.

22. The method in accordance with claim 14, further including a discount haggle which is a set percent number range by which a number within that range is selected at random.

23. The method in accordance with claim 14, wherein the sale is consummated only after one party presents a final offer.

24. A method of facilitating the sale of goods or services offered from at least one vendor to at least one buyer through an intermediary platform, in communication with the vendors and the buyers comprising the steps of: each of the vendors providing the intermediary platform with descriptive information relating to each of the goods or services offered by the respective vendor; said descriptive information including a retail sales price and a minimum sales price for each of the goods or services; constructing at least one haggle table, said haggle table stored in a memory device associated with a processor located at said intermediary platform; initiating a haggle process by the intermediary platform offering the retail price of each of the goods or services to the buyers; at least one of the buyers responding to said initiating step by communicating to the intermediary platform an aggregate counter offer to said retail prices for a plurality of the goods or services; the intermediary platform calculating an aggregate minimum sales price and an aggregate retail sales price for said plurality of goods or services; the intermediary platform comparing said aggregate counter offer to said aggregate minimum sales price of said plurality of the goods or services; and consummating the sale of said plurality of goods or services if said aggregate counter offer is greater than, or equal to, said aggregate minimum sales price of said a plurality of the goods or services,  wherein said haggle table comprises a list of desired discount amounts, used to produce aggregate counter offers responsive to a buyer's aggregate offer or counter offer for a plurality of good or service offered by at least one of the vendors, said desired discount amount equaling a buyer's aggregate offered price deducted from said aggregate retail sales price, and  wherein said discount haggle allows a seller to counter-offer based on a random selection within a pre-defined range.

25. The method in accordance with claim 24, further including the steps of: continuing said haggle process if said aggregate counter offer is less than said aggregate sale minimum price of said a plurality of the goods or services with the intermediary platform determining a second counter offer utilizing said aggregate retail sales prices, said aggregate counter offer, said aggregate minimum sales price and said haggle table; presenting said second counter offer to the buyer; and further continuing said haggle process until a final offer is accepted or no additional counter offers are made by the buyer or vendor.

26. The method in accordance with claim 25 wherein said second counter offer is determined by calculating a desired discount amount equaling the buyer's said aggregate counter offer deducted from said aggregate retail sale price, said desired discount amount then compared to the values provided in said haggle table to provide said second counter offer.

27. The method in accordance with claim 25 wherein the sale of said a plurality of the goods or services is consummated only after a predetermined number of offers and counter offers between the buyer and said intermediary have been exhausted.

28. The method in accordance with claim 24 wherein the sale of said a plurality of the goods or services is consummated only after a predetermined number of offers and counter offers between the buyer and said intermediary have been exhausted.

* * * * *